United States Patent
Zhang et al.

(10) Patent No.: US 10,588,137 B2
(45) Date of Patent: Mar. 10, 2020

(54) MEASUREMENT APPARATUS AND METHOD

(71) Applicant: Huawei Technologies Co., Ltd., Shenzhen (CN)

(72) Inventors: Jian Zhang, Shanghai (CN); Yuanjie Li, Shanghai (CN); Yongxing Zhou, Beijing (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 15/656,493

(22) Filed: Jul. 21, 2017

(65) Prior Publication Data

US 2017/0325244 A1 Nov. 9, 2017

Related U.S. Application Data

(63) Continuation of application No. PCT/CN2015/071350, filed on Jan. 22, 2015.

(51) Int. Cl.
*H04W 72/08* (2009.01)
*H04W 24/10* (2009.01)
(Continued)

(52) U.S. Cl.
CPC ......... *H04W 72/085* (2013.01); *H04L 5/0032* (2013.01); *H04L 5/0048* (2013.01);
(Continued)

(58) Field of Classification Search
CPC ............. H04W 24/10; H04W 36/0088; H04W 72/085; H04W 24/02; H04L 5/0032; H04L 5/0048; H04B 7/0617
See application file for complete search history.

(56) References Cited

U.S. PATENT DOCUMENTS

2013/0021932 A1   1/2013   Damnjanovic et al.
2013/0258885 A1  10/2013   Yu et al.
(Continued)

FOREIGN PATENT DOCUMENTS

CN   102415173 A   4/2012
CN   102448088 A   5/2012
(Continued)

OTHER PUBLICATIONS

"Part 11: Wireless LAN Medium Access Control (MAC) and Physical Layer (PHY) Specifications Amendment 3: Enhancements for Very High Throughput in the 60 GHz Band," IEEE Standard for Information Technology—Telecommunications and Information Exchange Between Systems Local and Metropolitan Area Networks—Specific requirements, IEEE Std. 802.11ad, 2012, 628 pages.

*Primary Examiner* — Vinncelas Louis
(74) *Attorney, Agent, or Firm* — Slater Matsil, LLP

(57) ABSTRACT

A measurement apparatus and method. The method includes sending, by a radio access network system, information about a subframe mode corresponding to at least one beam, where the information about the subframe mode instructs a UE to perform measurement according to the information about the subframe mode, and the method further includes receiving, by the radio access network system, a measurement result sent by the UE. The measurement apparatus and method can be used to perform the measurement in a millimeter wave scenario.

13 Claims, 5 Drawing Sheets

(51) Int. Cl.
*H04W 36/00* (2009.01)
*H04L 5/00* (2006.01)
*H04B 7/06* (2006.01)
*H04W 84/12* (2009.01)

(52) U.S. Cl.
CPC ....... *H04W 24/10* (2013.01); *H04W 36/0088* (2013.01); *H04B 7/0617* (2013.01); *H04W 84/12* (2013.01)

(56) References Cited

U.S. PATENT DOCUMENTS

| | | |
|---|---|---|
| 2013/0279356 A1* | 10/2013 | Park .................. H04W 24/02 370/252 |
| 2013/0310099 A1 | 11/2013 | van Rensburg et al. |
| 2013/0315087 A1* | 11/2013 | Zhang .................. H04W 24/10 370/252 |
| 2013/0336270 A1 | 12/2013 | Nagata et al. |
| 2016/0028463 A1 | 1/2016 | Wang et al. |
| 2016/0337916 A1* | 11/2016 | Deenoo .................. H04W 8/22 |

FOREIGN PATENT DOCUMENTS

| | | |
|---|---|---|
| CN | 103037399 A | 4/2013 |
| CN | 103237317 A | 8/2013 |
| CN | 103299668 A | 9/2013 |
| CN | 103748937 A | 4/2014 |
| CN | 104205911 A | 12/2014 |
| JP | 2013090148 A | 5/2013 |
| WO | 2013067016 A1 | 5/2013 |
| WO | 2014116928 A1 | 7/2014 |
| WO | 2014157867 A1 | 10/2014 |
| WO | 2014161183 A1 | 10/2014 |

* cited by examiner

MEASUREMENT APPARATUS AND METHOD

CROSS-REFERENCE TO RELATED APPLICATIONS

This application is a continuation of International Application No. PCT/CN2015/071350, filed on Jan. 22, 2015, the disclosure of which is hereby incorporated by reference in its entirety.

TECHNICAL FIELD

The present application relates to the communications field, and in particular, to a measurement apparatus and method.

BACKGROUND

With rapid development of packet services and intelligent terminals, spectrum requirements of high-speed, large-data-volume services continuously increase. A centimeter wave (centimeter wave) band usually refers to a spectrum ranging from 3 GHz to 30 GHz. A millimeter wave band usually refers to a spectrum ranging from 30 GHz to 300 GHz. A centimeter wave and a millimeter wave may be collectively referred to as a millimeter wave. Because the millimeter wave offers wide available bandwidth, it will become a potential target spectrum in future development of 5G communications and 3GPP Long Term Evolution Advanced (LTE-A). In the prior art, cellular communications such as LTE usually uses an approximately 2 GHz or lower band, and an LTE-A small cell enhancement standardization protect is studying and using a 3.5 GHz band. In the IEEE 802.11ad standard, a 60 GHz band is applied to a wireless local area network (WLAN), generally for indoor communication in a short distance of approximately 10 meters. In the prior art, 6 GHz or higher bands have not been applied to cellular communications. A major challenge in applying a high-frequency millimeter wave band to cellular communications lies in that this band experiences large free-space attenuation and also suffers from very severe attenuation caused by such factors as absorption by air and absorption and scattering by rain, fog, buildings, or other objects. A beamforming technology is considered to be a potential technology that can overcome the significant path loss of the millimeter wave. A massive or large scale multiple-input multiple-output (massive MIMO or large scale MIMO) system is considered to be a potential direction for implementing the beamforming technology in the millimeter wave band. FIG. 1(a) is a schematic diagram of beamforming. A base station transmits beams in different directions at different moments to achieve full coverage of a specific sector (sector, or referred to as cell cell). In the prior art, cellular communications is implemented using a low frequency band, an omni transmission manner is usually used for a common signal of a cell, such as a synchronization channel or a broadcast channel, and the beamforming technology is not used.

Measurement in the prior art is based on an omni-transmitted reference signal. For measurement based on a cell reference signal CRS (CRS) or a channel state information reference signal (CSI-RS), UE can receive the foregoing reference signal at any location in a cell to perform the measurement. However, when the foregoing reference signal is sent by using a beam, the UE may fail to receive the reference signal at some moments because the beam may be directed to other locations at these moments.

SUMMARY

Embodiments of the present application provide a measurement apparatus and method, to perform effective measurement in a millimeter wave scenario.

According to a first aspect, a measurement method is provided, including sending, by a radio access network system, information about a subframe mode corresponding to at least one beam, where the information about the subframe mode is used to instruct UE to perform measurement according to the information about the subframe mode, and receiving, by the radio access network system, a measurement result sent by the UE.

In a first possible implementation manner, the subframe mode is a cell-specific mode and is applicable to all UEs in a particular cell.

In a second possible implementation manner, the subframe mode is a UE-specific mode, a particular UE is applicable to a particular subframe mode, and different UEs are applicable to a same or different subframe modes.

In a third possible implementation manner, with reference to the first aspect or the first or second possible implementation manner of the first aspect, before the sending, by a radio access network system, information about a subframe mode, the method further includes: receiving, by the radio access network system, information about a beam mode and the information about the subframe mode of a neighboring base station; and sending, by the radio access network system, information about a beam mode and the information about the subframe mode of the radio access network system to the neighboring base station, where the reference signal is sent by the neighboring base station.

In a fourth possible implementation manner, with reference to the first aspect or any one of the first to third possible implementation manners of the first aspect, the radio access network system further sends a measurement configuration message to the UE, where the measurement configuration message includes measurement gap configuration information on at least one beam, and the measurement gap configuration information is used to instruct the UE to perform measurement for an inter-frequency neighboring cell on a corresponding beam.

According to a second aspect, a measurement method is provided, including: receiving, by UE, information about a subframe mode that corresponds to at least one beam and that is sent by a radio access network system, where the information about the subframe mode is used to instruct the UE to perform measurement according to the information about the subframe mode; performing, by the UE, the measurement according to the information about the subframe mode of a beam on which the UE resides; and sending, by the UE, a measurement result to the radio access network system.

In a first possible implementation manner, before the performing, by the UE, the measurement according to the subframe information of a beam on which the UE resides, the method further includes: receiving, by the UE, the reference signal sent by the radio access network system, where the beam on which the UE resides is sent by the radio access network system.

In a second possible implementation manner, before the performing, by the UE, the measurement according to the subframe information of a beam on which the UE resides, the method further includes receiving, by the UE, the reference signal sent by a neighboring base station, where the neighboring base station is neighboring to the radio access network system.

In a third possible implementation manner, with reference to the second possible implementation manner of the second aspect, the UE receives a measurement configuration message sent by the radio access network system, where the measurement configuration message includes measurement gap configuration information on at least one beam, and the measurement gap configuration information is used to instruct the UE to perform measurement for an inter-frequency neighboring cell on a corresponding beam.

In a fourth possible implementation manner, with reference to the second aspect or any one of the first to third possible implementation manners of the second aspect, the measurement result is a measurement result of the UE on a plurality of beams.

According to a third aspect, a radio access network system is provided, where the radio access network system includes at least one base station, and the base station includes: a transmission module, where the transmission module is configured to send information about a subframe mode corresponding to at least one beam, where the information about the subframe mode is used to instruct UE to perform measurement according to the information about the subframe mode; a receiving module, where the receiving module is configured to receive a measurement result sent by the UE; and a processing module, configured to generate the measurement configuration message.

In a first possible implementation manner, the subframe mode is a cell-specific mode and is applicable to all UEs in a particular cell.

In a second possible implementation manner, the subframe mode is a UE-specific mode, a particular UE is applicable to a particular subframe mode, and different UEs are applicable to a same or different subframe modes.

In a third possible implementation manner, with reference to the third aspect or the first or second possible implementation manner of the third aspect, the receiving module is further configured to receive information about a beam mode and the information about the subframe mode of a neighboring base station; and the transmission module is further configured to send information about a beam mode and the information about the subframe mode of the radio access network system to the neighboring base station.

In a fourth possible implementation manner, with reference to the third possible implementation manner of the third aspect, the transmission module is further configured to send a measurement configuration message, where the measurement configuration message includes measurement gap configuration information on at least one beam, and the measurement gap configuration information is used to instruct the UE to perform measurement for an inter-frequency neighboring cell on a corresponding beam.

According to a fourth aspect, UE is provided, where the UE includes a receiving module, where the receiving module is configured to receive information about a subframe mode corresponding to at least one beam, where the information about the subframe mode is used to instruct the UE to perform measurement according to the information about the subframe mode, a processing module, where the processing module is configured to perform measurement according to the information about the subframe mode of a beam on which the UE resides and generate a measurement result, and a transmission module, where the transmission module is configured to send the measurement result to the radio access network system.

In a first possible implementation manner, the receiving module is further configured to receive the reference signal sent by the radio access network system; and the beam on which the UE resides is sent by the radio access network system.

In a second possible implementation manner, the receiving module is further configured to receive the reference signal sent by a neighboring base station; and the neighboring base station is neighboring to the radio access network system.

In a third possible implementation manner, with reference to the second possible implementation manner of the fourth aspect, the receiving module is further configured to receive a measurement configuration message, where the measurement configuration message includes measurement gap configuration information on at least one beam, and the measurement gap configuration information is used to instruct the UE to perform measurement for an inter-frequency neighboring cell on a corresponding beam.

In a fourth possible implementation manner, with reference to the fourth aspect or any one of the first to third possible implementation manners of the fourth aspect, the measurement result is a measurement result of the UE on a plurality of beams.

According to a fifth aspect, a radio access network system is provided, where the radio access network system includes at least one base station, and the base station includes: a transmitter, where the transmitter is configured to send information about a subframe mode corresponding to at least one beam, where the information about the subframe mode is used to instruct UE to perform measurement according to the information about the subframe mode and a receiver, where the receiver is configured to receive a measurement result sent by the UE; and a processor, configured to generate the measurement configuration message.

In a first possible implementation manner, the subframe mode is a cell-specific mode and is applicable to all UEs in a particular cell.

In a second possible implementation manner, the subframe mode is a UE-specific mode, a particular UE is applicable to a particular subframe mode, and different UEs are applicable to a same or different subframe modes.

In a third possible implementation manner, with reference to the fifth aspect or the first or second possible implementation manner of the fifth aspect, the receiver is further configured to receive information about a beam mode and the information about the subframe mode of a neighboring base station; and the transmitter is further configured to send information about a beam mode and the information about the subframe mode of the radio access network system to the neighboring base station.

In a fourth possible implementation manner, with reference to the third possible implementation manner of the fifth aspect, the transmitter is further configured to send a measurement configuration message, where the measurement configuration message includes measurement gap configuration information on at least one beam, and the measurement gap configuration information is used to instruct the UE to perform measurement for an inter-frequency neighboring cell on a corresponding beam.

According to a sixth aspect, UE is provided, where the UE includes: a receiver, where the receiver is configured to receive information about a subframe mode corresponding to at least one beam, where the information about the subframe mode is used to instruct the UE to perform measurement according to the information about the subframe mode; a processor, where the processor is configured to perform measurement according to the information about the subframe mode of a beam on which the UE resides and generate a measurement result; and a transmitter, where the transmitter is configured to send the measurement result to the radio access network system.

In a first possible implementation manner, the receiver is further configured to receive the reference signal sent by the radio access network system; and the beam on which the UE resides is sent by the radio access network system.

In a second possible implementation manner, the receiver is further configured to receive the reference signal sent by a neighboring base station; and the neighboring base station is neighboring to the radio access network system.

In a third possible implementation manner, with reference to the second possible implementation manner of the sixth aspect, the receiver is further configured to receive a measurement configuration message, where the measurement configuration message includes measurement gap configuration information on at least one beam, and the measurement gap configuration information is used to instruct the UE to perform measurement for an inter-frequency neighboring cell on a corresponding beam.

In a fourth possible implementation manner, with reference to the sixth aspect or any one of the first to third possible implementation manners of the sixth aspect, the measurement result is a measurement result of the UE on a plurality of beams.

BRIEF DESCRIPTION OF THE DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

It should be understood that, the technical solutions of the embodiments of the present application may be applied to various communications systems, such as: a Global System for Mobile Communications ("GSM" for short) system, a Code Division Multiple Access ("CDMA" for short) system, a Wideband Code Division Multiple Access ("WCDMA" for short) system, a general packet radio service ("GPRS" for short), a Long Term Evolution ("LTE" for short) system, an LTE frequency division duplex ("FDD" for short) system, an LTE time division duplex ("TDD" for short), a Universal Mobile Telecommunications System ("UMTS" for short), a Worldwide Interoperability for Microwave Access ("Wi-MAX" for short) communications system, a millimeter wave communications system or the like.

In the embodiments of the present application, a base station may be a base station ("BTS" for short) in GSM or CDMA, may be a base station (NodeB, "NB" for short) in WCDMA, or may further be an evolved NodeB (Evolutional Node B, "ENB" or "eNodeB" for short) in LTE, or a base station in a millimeter wave communications system. This is not limited in the present application.

To make the objectives, features and advantages of the embodiments of the present application more comprehensible, the embodiments of the present application are further described in detail below with reference to the accompanying drawings and specific embodiments.

Figure 1A:
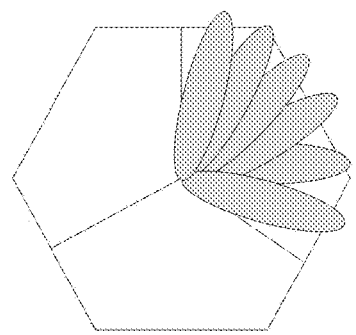
FIG. 1(a) is a schematic diagram of beamforming in the prior art.

FIG. 1(a) is a schematic diagram of beamforming according to an embodiment of the present application. A base station transmits beams in different directions at different moments to achieve full coverage of a sector. In this embodiment, beamforming may be implemented in two manners: One is a beam switching manner, which may be implemented by using an analog or radio frequency circuit; the other is an adaptive beam manner, which is usually implemented by using a digital circuit. The beamforming technology mentioned in the embodiments of present application not only may refer to a beam in a horizontal plane, but also may refer to a beam in a vertical plane.

Figure 1B:
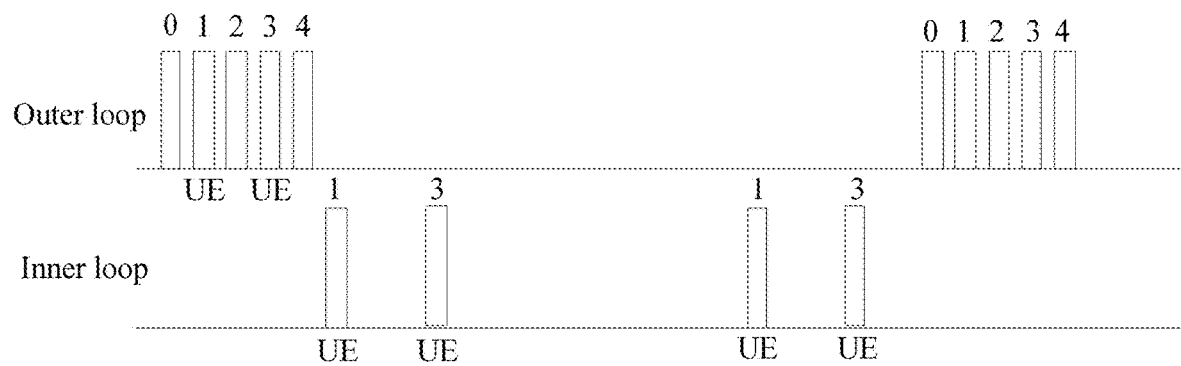
FIG. 1(b) is a schematic diagram of beamforming of a base station using two cycles according to an embodiment of the present application.

FIG. 1(b) is a schematic diagram of beamforming of a base station using two cycles according to an embodiment of the present application.

A base station may send a common signal in a one-cycle manner or a two-cycle manner. For the one-cycle manner, in one period, the base station sequentially sends beam information in different beam directions, so that beams can cover an entire sector, and UE that receives a beam feeds back beam identifier information of the beam to the base station. In a next period, the base station and the UE separately perform the foregoing process again.

For the two-cycle manner, in cycle 1 (outer loop), the base station sends beams according to the foregoing one-cycle manner, and UE that receives a beam feeds back beam identifier information of the beam to the base station, and in cycle 2 (inner loop), the base station only sends a beam to a beam location at which UE exists and does not send a beam in a direction in which no UE exists, thereby reducing interference on a neighboring cell and saving energy.

Figure 2:
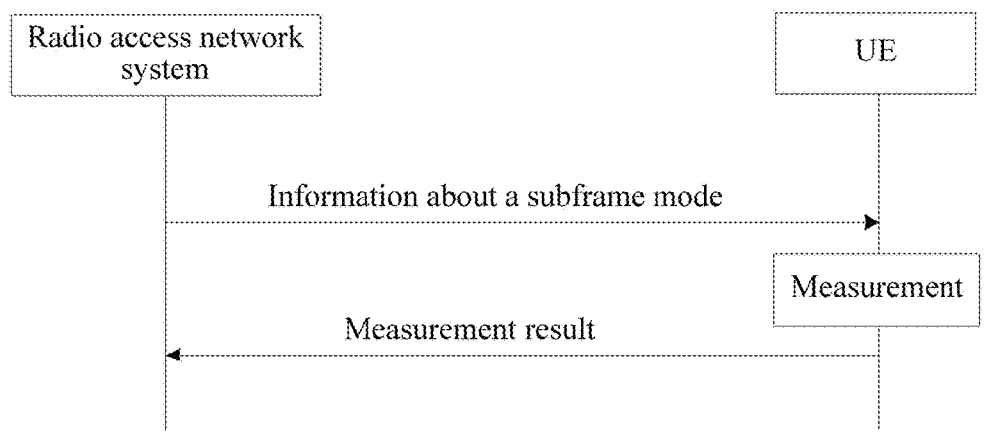
FIG. 2 is a schematic flowchart of a measurement method according to an embodiment of the present application.

FIG. 2 is a flowchart of an embodiment of the present application. A method disclosed by FIG. 2 and a description thereof may be based on the beamforming methods disclosed by FIG. 1(a), FIG. 1(b), and the descriptions thereof in the embodiments of the present application. As shown in FIG. 2, A radio access network system sends information about a subframe mode corresponding to at least one beam to UE. The information about the subframe mode may be included in a measurement configuration message or may be independent of measurement configuration information. The information about the subframe mode may be included in a radio resource control connection reconfiguration (RRC Connection Reconfiguration) message, or may be broadcast by using a system message. The information about the subframe mode is used to instruct the UE to perform measurement. The subframe mode includes at least one of the following: information about a subframe mode of a frequency of a serving cell, information about a subframe mode of an intra-frequency neighboring cell, or information about a subframe mode of an inter-frequency neighboring cell. The information about the subframe mode of the frequency of the serving cell is used by the UE to perform measurement for the serving cell on the beam. The information about the subframe mode of the intra-frequency neighboring cell is used by the UE to perform measurement for the intra-frequency neighboring cell on the beam. The information about the subframe mode of the inter-frequency neighboring cell is used by the UE to perform measurement for the inter-frequency neighboring cell on the beam.

The radio access network system may include at least one base station. The base station may be a macro base station or a millimeter wave base station, or may include both a micro base station and a millimeter wave base station. The information about the subframe mode may be sent by any type of base station in the radio access network system. The measurement may be performed according to a reference signal. The reference signal may be a reference signal of a serving frequency or a serving cell. The reference signal may include a cell reference signal (CRS) and a channel state information reference signal (CSI-RS). The reference signal may be sent by the radio access network system. In the present application, a reference signal sent by a millimeter wave base station on a cell in a millimeter wave band is used as an example for description. Optionally, the UE may perform measurement according to a pilot or a beacon.

In the radio access network system, different beams may correspond to a same or different subframe modes. Measurement performed by the UE on any beam may be performed based on all subframes in a subframe mode configured for the beam, or a subset of the subframes. The subset includes some subframes of all the subframes. The subframe mode corresponding to the beam may be a cell-specific or beam specific subframe mode that is applicable to all UEs in a particular cell or a particular beam, or may be a UE-specific subframe mode with a same or different subframe modes being configured for different UEs. Alternatively, a cell-specific beam mode applicable to all UEs in a particular cell may be configured for different cells, or a UE-specific beam mode may be configured for different UEs, so as to configure different beam modes for different UEs. The beam mode may refer to at least one or more of the following information: information such as a quantity of beams, a beam switching (or referred to as beam scanning) sequence, or a beam switching time. The measurement in this embodiment of the present application may be radio resource management (RRM) measurement, channel state information CSI (CSI) measurement, or radio link monitoring (RLM) measurement. The RRM measurement may be measurement based on reference signal received power (RSRP) or reference signal received quality (RSRQ) of a cell reference signal CRS or channel state reference signal CSI-RS. The channel state information CSI measurement may be measurement based on a CRS or a CSI-RS. The RLM measurement refers to that UE monitors downlink radio link quality based on a CRS and compares the downlink radio link quality with thresholds $Q_{OUT}$ and $Q_{IN}$ to determine whether a radio link failure (RLF) occurs.

For example, an integer quantity N of beams are configured for a cell, and a measurement subframe on each beam is configured. All the beams may correspond to a same subframe mode. For example, the beams are used for measurement in subframes 0 and 5 of each radio frame. For another example, each beam corresponds to a different subframe mode. For example, beams 1 to 9 are respectively used for measurement in subframes 0 to 8.

Optionally, only a subframe mode corresponding to one of the beams is configured, and a beam scanning mode is configured. The beam scanning mode includes a beam scanning sequence and a time interval for switching between beams. For example, on a network, a subframe mode configured on beam 0 is subframe 0, a configured beam scanning sequence is from beam 0 to beam 6, a time interval for switching is one subframe, a rotation period is four radio frames, that is, a scan from beam 0 to beam 6 is performed once in every four radio frames, and each radio frame includes 10 subframes. UE calculates a subframe in which the UE can receive a reference signal on each beam, that is, subframe 0 of radio frame 0, subframe 0 of radio frame 4, and subframe 0 of radio frame 8 for beam 0; subframe 1 of radio frame 0, subframe 1 of radio frame 4, and subframe 1 of radio frame 8 for beam 1; subframe 2 of radio frame 0, subframe 2 of radio frame 4, and subframe 2 of radio frame 8 for beam 2; and so on.

The UE performs measurement according to the information about the subframe mode corresponding to a beam on which the UE resides.

The measurement configuration message further includes information such as a reporting period or a triggering threshold, and the UE sends a measurement result to the radio access network system according to the reporting period and/or the triggering threshold in the measurement configuration message.

Optionally, the UE may be located at different locations in a cell because of movement, and the UE performs measurement according to the information about the subframe mode corresponding to the beam on which the UE resides. When the UE reports a measurement result, the measurement result may be an average of measurement results of the UE on a plurality of beams or may be obtained by separately averaging measurement results on each beam on which the UE resides. In a case of averaging the measurement results on each beam on which the UE resides, the measurement result sent by the UE to the radio access network system may further include beam identifier information. Specifically, each beam in this embodiment has corresponding beam identifier information, the beam identifier information uniquely corresponds to one beam, and the beam identifier information may be carried by using a synchronization channel, a broadcast channel, or the like. When the measurement result does not include beam identifier information, it is considered by default that the measurement result is an average of measurement results on a current beam on which the UE resides or an average of measurement results of all the beams. The measurement result may be received by a macro base station or a millimeter wave base station in the radio access network system.

In this embodiment, beamforming is used for a common channel and a reference signal, and subframe modes of the UE for RRM measurement, CSI measurement, and RLM on at least one beam of a serving frequency or a serving cell are configured, so that the UE can accurately learn subframes in which a reference signal can be received on the beam on which the UE resides, so as to perform measurement based on the reference signal, thereby avoiding an inaccurate measurement result caused by that the UE performs measurement when a network does not send a reference signal to the beam on which the UE resides, and resolving a coverage problem of the common channel or the reference signal and a measurement accuracy problem of the UE.

Figure 3:
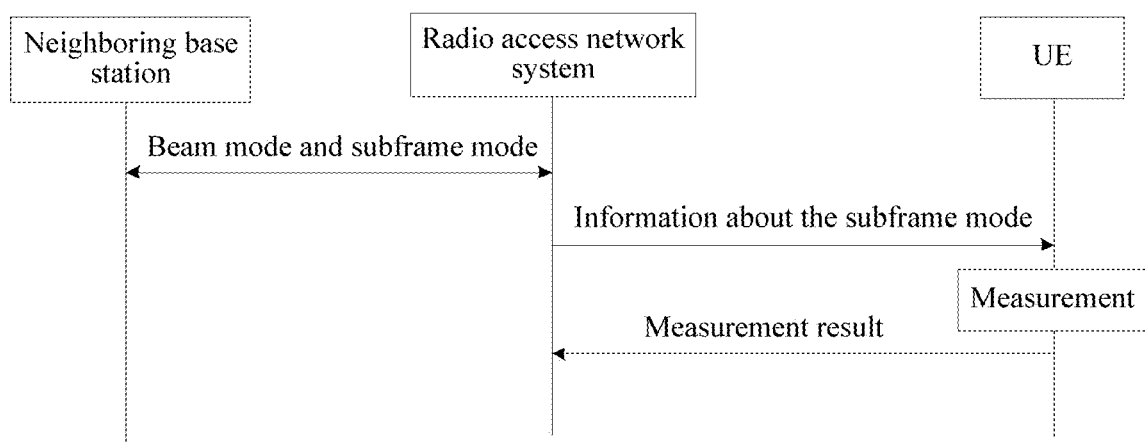
FIG. 3 is another schematic flowchart of a measurement method according to an embodiment of the present application.

FIG. 3 is another flowchart of an embodiment of the present application. A method disclosed by FIG. 3 and a description thereof may be based on the methods disclosed by FIG. 1(a), FIG. 1(b), FIG. 2, and the descriptions thereof in the embodiments of the present application. As shown in FIG. 3, base stations of a radio access network system and a neighboring radio access network system are base stations of intra-frequency neighboring cells, that is, the radio access network system and the neighboring base station are neighboring to each other and have a same frequency.

The radio access network system receives information about a beam mode and the information about the subframe mode of the base station of the neighboring radio access network system. The radio access network system may receive the information about the beam mode and the information about the subframe mode of the neighboring base station, in a scenario such as when a network-to-network interface is established, or when configuration information such as a beam mode and a subframe mode of a network is updated, or when a network prepares to configure measurement on an intra-frequency neighboring cell for UE or configure inter-base station carrier aggregation for UE. The neighboring base station sends the information about the beam mode and the information about the subframe mode of the neighboring base station to the radio access network system. Sending of the information about the beam mode and the subframe mode between the radio access network system and the neighboring base station may be initiated by the radio access network system or the neighboring base station. The exchanged beam mode and subframe mode may be cell-specific modes applicable to all UEs in a particular cell, or may be UE-specific modes.

The radio access network system determines, according to the information about the beam mode and the information about the subframe mode sent by the neighboring base station and information about a beam mode and information about a subframe mode of a cell provided by the radio access network system, subframes in which a reference signal is sent by a neighboring network on a corresponding beam in beam directions of the radio access network system. For example, in a scenario shown in FIG. 4, beams 3, 4, and 5 of two neighboring cells correspond to each other, so that the network may configure, according to a subframe mode of a neighboring base station on beams 3, 4, and 5, a subframe mode for the UE to perform measurement for a neighboring cell on beams 3, 4, and 5 of a serving cell.

The radio access network system sends information about a subframe mode corresponding to at least one beam to the UE. The subframe mode is used to instruct the UE to perform measurement for a neighboring cell. Subframe modes used by the UE to perform measurement for an intra-frequency neighboring cell on different beams may be the same or different. Subframe modes used by the UE to perform measurement for the serving cell and the neighboring cell on a particular beam may be the same or different. The UE may perform measurement based on all configured subframes of the neighboring cell or a subset of the subframes. The subset includes some subframes of all the subframes. Optionally, the radio access network system may configure, for the UE, subframe modes of a plurality of neighboring cells on at least one beam for the UE to receive reference signals of a plurality of intra-frequency neighboring cells to perform measurement. Optionally, the UE may perform measurement according to a pilot or a beacon.

The measurement in this embodiment of the present application may be RRM measurement, CSI measurement, or RLM measurement.

The UE performs measurement according to information about a subframe mode of an intra-frequency neighboring cell on a beam on which the UE resides, and sends a measurement result of the neighboring cell to the radio access network system according to a configured reporting period and/or triggering threshold of the measurement for the neighboring cell.

Specifically, the UE may be located at different locations in a cell because of movement, and the UE performs measurement according to measurement subframe configuration of the neighboring cell on the beam on which the UE resides.

When the UE sends a measurement result, the measurement result may be an average of measurement results of the UE for the neighboring cell on a plurality of beams or may be obtained by separately averaging measurement results for the neighboring cell on each beam on which the UE resides. In a case of averaging the measurement results on each beam on which the UE resides, the measurement result sent by the UE may further include beam identifier information of the serving cell. Specifically, each beam in this embodiment has corresponding beam identifier information, the beam identifier information uniquely corresponds to one beam, and the beam identifier information may be carried by using a synchronization channel or a broadcast channel. When the measurement result does not include beam identifier information, it is considered by default that the measurement result is an average of measurement results on a current beam on which the UE resides or an average of measurement results of all the beams.

The beam refers to a beam, on which the UE resides, of the serving cell. Certainly, the UE may also obtain a cell identity and a beam identifier of the neighboring cell by detecting a synchronization channel or a broadcast channel of the neighboring cell. Correspondingly, the UE may additionally add information about the cell identity and the beam identifier of the neighboring cell in a result of the foregoing RRM measurement and a result of the foregoing CSI measurement. The cell identity includes information about a physical cell identity and/or a cell global identifier (CGI, cell global identity or ECGI, evolved global identity).

In this embodiment, a radio access network system exchanges beam mode and subframe mode information with at least one neighboring base station, so that the radio access network system configures RRM measurement, CSI measurement, and/or RLM measurement performed on at least one beam by UE for an intra-frequency neighboring cell. The RRM measurement, CSI measurement, and/or RLM measurement may be used for an operation such as mobility management on the UE or coordinated multipoint transmission (CoMP) to the intra-frequency neighboring cell. When radio channel quality of the intra-frequency neighboring cell is higher than radio channel quality of the serving cell by a given threshold, the UE is handed over to the intra-frequency neighboring cell to improve network quality of service.

Figure 4:
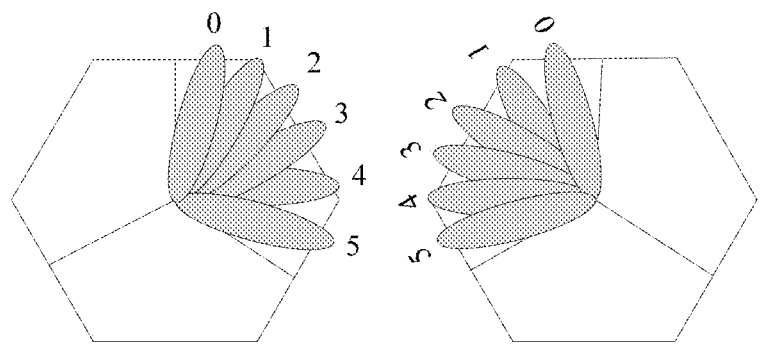
FIG. 4 is a schematic diagram of beams of neighboring cells according to an embodiment of the present application.
Figure 5:
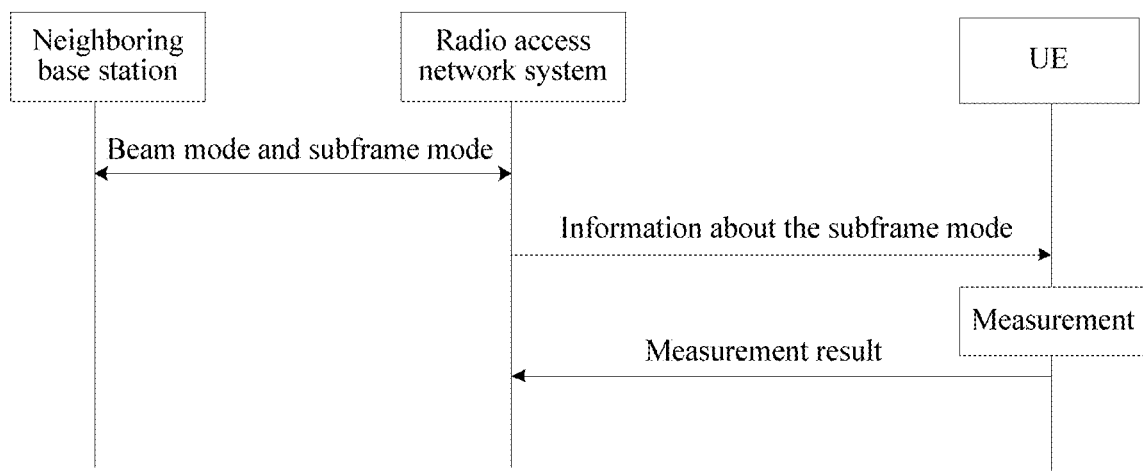
FIG. 5 is still another schematic flowchart of a measurement method according to an embodiment of the present application.

FIG. 5 is another flowchart of an embodiment of the present application. A method disclosed by FIG. 5 and a description thereof may be based on the methods disclosed by FIG. 1(a) and FIG. 1(b) to FIG. 4 and the descriptions thereof in the embodiments of the present application. As shown in FIG. 5, a radio access network system and a neighboring base station are base stations of inter-frequency neighboring cells, that is, the radio access network system and the neighboring base station are neighboring to each other and have different frequencies.

The radio access network system receives information about a beam mode and the information about the subframe mode of the neighboring base station. The radio access network system may receive the information about the beam mode and the information about the subframe mode of the neighboring base station, in a scenario such as when a network-to-network interface is established, or when configuration information such as a beam mode and a subframe mode of a network is updated, or when a network prepares to configure measurement on an inter-frequency neighboring cell for UE. The neighboring base station sends the information about the beam mode and the information about the subframe mode of the neighboring base station to the radio access network system. Sending of the information about the beam mode and the subframe mode between the radio access network system and the neighboring base station may be initiated by the radio access network system or the neighboring base station. The exchanged beam mode and subframe mode may be cell-specific modes applicable to all UEs in a particular cell.

The radio access network system determines, according to the information about the beam mode and the information about the subframe mode sent by the neighboring base station and information about a beam mode and information about a subframe mode of a cell provided by the radio access network system, subframes in which a reference signal is sent by a neighboring network on a corresponding beam in beam directions of the radio access network system. For example, in a scenario shown in FIG. 4, beams 3, 4, and 5 of two neighboring cells correspond to each other, so that the network may configure, according to a subframe mode of a neighboring base station on beams 3, 4, and 5, a subframe mode for the UE to perform measurement for a neighboring cell on beams 3, 4, and 5 of a serving cell.

The radio access network system sends information about a subframe mode corresponding to at least one beam to UE. The information about the subframe mode may be included in a measurement configuration message or may be separately broadcast by using a system message. The subframe mode is used to instruct the UE to receive a reference signal (CRS and/or CSI-RS) sent by a neighboring base station of an inter-frequency neighboring cell to perform measurement for the neighboring cell. The measurement configuration message further includes configuration information of a measurement gap on at least one beam, and the measurement gap is used to instruct the UE to perform measurement for an inter-frequency neighboring cell on a corresponding beam. The measurement gap is a subset of subframes represented by the measurement subframe mode of the inter-frequency neighboring cell on the beam or all of the subframes. That is, the measurement subframe mode of the inter-frequency neighboring cell on the beam is a subframe in which the measurement gap is located, and on the subframe, the network does not schedule the UE, and the UE also does not perform transmission and reception.

Subframe modes used by the UE to perform measurement for an inter-frequency neighboring cell on different beams may be the same or different. Subframe modes used by the UE to perform measurement for the serving cell and the neighboring cell on a particular beam may be the same or different. The UE may perform measurement based on all configured subframes of the neighboring cell or a subset of the subframes. The subset includes some subframes of all the subframes. Optionally, the radio access network system may configure, for the UE, subframe modes of a plurality of neighboring cells on at least one beam for the UE to perform measurement for the inter-frequency neighboring cell. The measurement in this embodiment of the present application may be RRM measurement, CSI measurement, or RLM measurement. The UE performs measurement according to information about a subframe mode of an inter-frequency neighboring cell on a beam on which the UE resides and sends a measurement result of the neighboring cell to the $X^{th}$ base station according to a configured reporting period and/or triggering threshold of the measurement for the neighboring cell.

Specifically, the UE may be located at different locations in a cell because of movement, and the UE performs measurement according to measurement subframe configuration of the neighboring cell on the beam on which the UE resides.

When the UE sends a measurement result, the measurement result may be an average of measurement results of the UE for the neighboring cell on a plurality of beams or may be obtained by separately averaging measurement results for the neighboring cell on each beam on which the UE resides. In a case of averaging the measurement results on each beam on which the UE resides, the measurement result sent by the UE may further include beam identifier information of the serving cell. Specifically, each beam in this embodiment has corresponding beam identifier information, the beam identifier information uniquely corresponds to one beam, and the beam identifier information may be carried by using a synchronization channel or a broadcast channel. When the measurement result does not include beam identifier information, it is considered by default that the measurement result is an average of measurement results on a current beam on which the UE resides or an average of measurement results of all the beams.

The beam refers to a beam, on which the UE resides, of the serving cell. Certainly, the UE may also obtain a cell identity and a beam identifier of the neighboring cell by detecting a synchronization channel or a broadcast channel of the neighboring cell. Correspondingly, the UE may additionally add information about the cell identity and the beam identifier of the neighboring cell in a result of the foregoing RRM measurement, a result of the foregoing CSI measurement, and a result of the foregoing RLM measurement. In this embodiment, a radio access network system exchanges beam mode and subframe mode information with at least one neighboring base station, so that the radio access network system configures RRM measurement, CSI measurement, and/or RLM measurement performed on at least one beam by UE for an inter-frequency neighboring cell. The RRM measurement, CSI measurement, and/or RLM measurement may be used for an operation such as mobility management on the UE or coordinated multipoint transmission (CoMP) to the inter-frequency neighboring cell. When radio channel quality of the inter-frequency neighboring cell is higher than radio channel quality of the serving cell by a given threshold, the UE is handed over to the inter-frequency neighboring cell to improve network quality of service.

Figure 6:
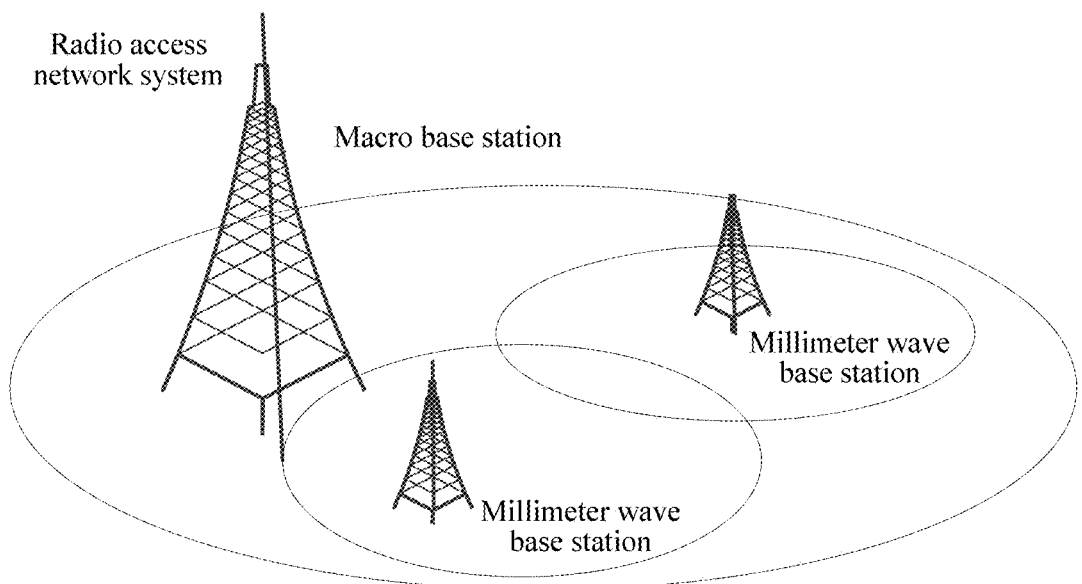
FIG. 6 is a schematic block diagram of a radio access network system according to an embodiment of the present application.
Figure 7:
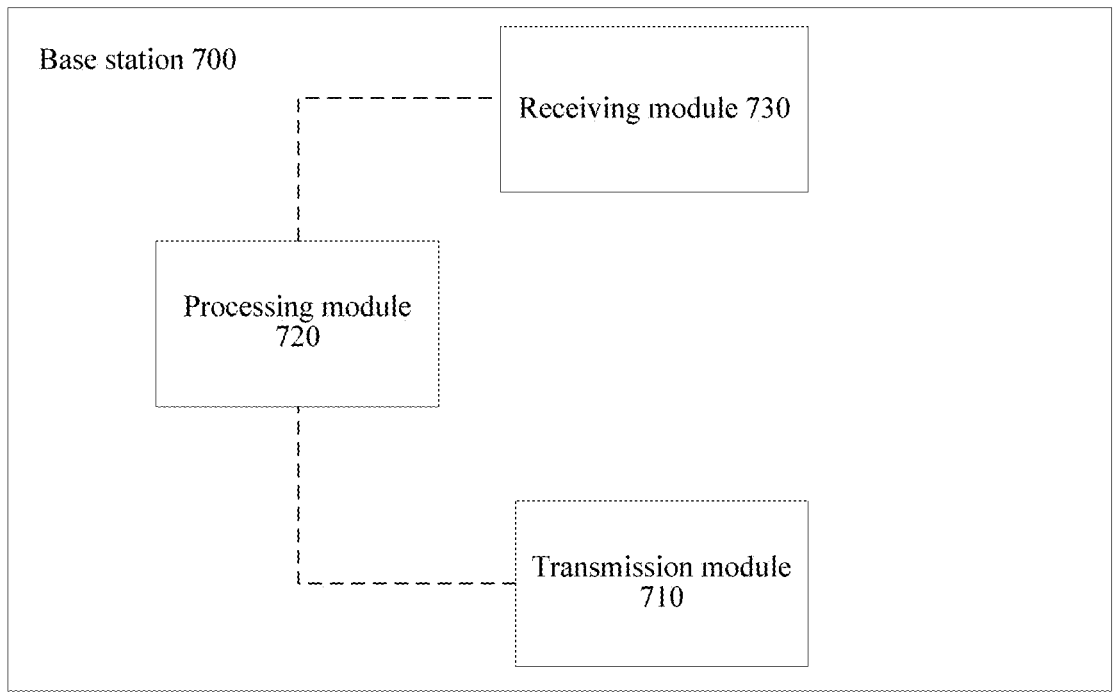
FIG. 7 is a schematic block diagram of a base station in a radio access network system according to an embodiment of the present application.

FIG. 6 is a schematic diagram of a radio access network system according to an embodiment of the present application. The radio access network system includes at least one base station 700. The base station may be a macro base station or a millimeter wave base station, or may include both a micro base station and a millimeter wave base station. FIG. 7 is a schematic block diagram of the base station 700. The system disclosed by FIG. 6 and a description thereof and the base station disclosed by FIG. 7 and a description thereof may be both based on the methods disclosed by FIG. 1(a) and FIG. 1(b) to FIG. 5 and the descriptions thereof in the embodiments of the present application. The base station 700 includes:

a transmission module 710, where the transmission module 710 is configured to send information about a subframe mode corresponding to at least one beam, where the information about the subframe mode is used to instruct UE to perform measurement according to the information about the subframe mode.

Specifically, the information about the subframe mode may be included in a measurement configuration message or may be independent of measurement configuration information. The information about the subframe mode may be included in a radio resource control connection reconfiguration (RRC Connection Reconfiguration) message, or may be broadcast by using a system message. The information about the subframe mode is used to instruct the UE to perform measurement. The subframe mode includes at least one of the following: information about a subframe mode of a frequency of a serving cell, information about a subframe mode of an intra-frequency neighboring cell, or information about a subframe mode of an inter-frequency neighboring cell. The information about the subframe mode of the frequency of the serving cell is used by the UE to perform measurement for the serving cell on the beam. The information about the subframe mode of the intra-frequency neighboring cell is used by the UE to perform measurement for the intra-frequency neighboring cell on the beam. The information about the subframe mode of the inter-frequency neighboring cell is used by the UE to perform measurement for the inter-frequency neighboring cell on the beam.

A receiving module 730, where the receiving module 730 is configured to receive a measurement result sent by the UE.

A processing module 720, configured to generate the information about the subframe mode.

The information about the subframe mode may be sent over a beam of the radio access network system. The UE may correspond to a same or different subframe modes on different beams. The UE may perform measurement based on all configured subframes or a subset of the subframes. The subset includes some subframes of all the subframes. The subframe mode corresponding to the beam may be a cell-specific mode applicable to all UEs in a particular cell, or may be a UE-specific mode with different subframe modes being configured for different UEs. Alternatively, a cell-specific beam mode applicable to all UEs in a particular cell may be configured for different cells, or a UE-specific beam mode may be configured for different UEs, so as to configure different beam modes for different UEs. The beam mode may refer to at least one or more of the following information: information such as a quantity of beams, a beam switching (or referred to as beam scanning) sequence, or a beam switching time. The measurement in this embodiment of the present application may be RRM measurement, CSI measurement, or RLM measurement.

For example, an integer quantity N of beams are configured for a cell, and a measurement subframe on each beam is configured. All the beams may correspond to a same subframe mode. For example, the beams are used for measurement in subframes 0 and 5 of each radio frame. For another example, each beam corresponds to a different subframe mode. For example, beams 1 to 9 are respectively used for measurement in subframes 0 to 8.

Optionally, only a subframe mode corresponding to one of the beams is configured, and a beam scanning mode is configured. The beam scanning mode includes a beam scanning sequence and a time interval for switching between beams. For example, on a network, a subframe mode configured on beam 0 is subframe 0, a configured beam scanning sequence is from beam 0 to beam 6, a time interval for switching is one subframe, a rotation period is four radio frames, that is, a scan from beam 0 to beam 6 is performed once in every four radio frames, and each radio frame includes 10 subframes. UE calculates a subframe in which the UE can receive a reference signal on each beam, that is, subframe 0 of radio frame 0, subframe 0 of radio frame 4, and subframe 0 of radio frame 8 for beam 0; subframe 1 of radio frame 0, subframe 1 of radio frame 4, and subframe 1 of radio frame 8 for beam 1; subframe 2 of radio frame 0, subframe 2 of radio frame 4, and subframe 2 of radio frame 8 for beam 2; and so on.

The UE performs measurement according to information about a subframe mode corresponding to a beam on which the UE resides. The receiving module 730 receives the measurement result.

In this embodiment, beamforming is used for a common channel and a reference signal, and subframe modes of the UE for RRM measurement, CSI measurement, and RLM on at least one beam of a serving frequency or a serving cell are configured, so that the UE can accurately learn subframes in which a reference signal can be received on the beam on which the UE resides, so as to perform measurement based on the reference signal, thereby avoiding an inaccurate measurement result caused by that the UE performs measurement when a network does not send a reference signal to the beam on which the UE resides, and resolving a coverage problem of the common channel or the reference signal and a measurement accuracy problem of the UE.

Optionally, the receiving module 730 is further configured to receive information about a beam mode and information about a subframe mode of a neighboring base station neighboring to the radio access network system. The radio access network system and the neighboring base station are base stations of intra-frequency neighboring cells, that is, the radio access network system and the neighboring base station are neighboring to each other and have a same frequency. The receiving module 730 of the base station in the radio access network system may receive the information about the beam mode and the information about the subframe mode of the neighboring base station, in a scenario such as when a network-to-network interface is established, or when configuration information such as a beam mode and a subframe mode of a network is updated, or when a network prepares to configure measurement on an intra-frequency neighboring cell for UE. The neighboring base station sends the information about the beam mode and the information about the subframe mode of the neighboring base station to the radio access network system. Sending of the information about the beam mode and the subframe mode between the radio access network system and the neighboring base station may be initiated by the radio access network system or the neighboring base station. The exchanged beam mode and subframe mode may be cell-specific modes applicable to all UEs in a particular cell.

The radio access network system, according to the information about the beam mode and the subframe mode sent by the neighboring base station and information about a beam mode and a subframe mode of a cell provided by the radio access network system, the processing module 720 is further configured to determine subframes in which a reference signal is sent by a neighboring network on a corresponding beam in beam directions of the radio access network system. As shown in FIG. 4, beams 3, 4, and 5 of two neighboring cells correspond to each other, so that according to a subframe mode of a neighboring base station on beams 3, 4, and 5, a subframe mode for the UE to perform measurement for a neighboring cell on beams 3, 4, and 5 of a serving cell may be configured.

The transmission module 710 of the base station in the radio access network system is further configured to send information about a subframe mode corresponding to at least one beam to UE. The information about the subframe mode may be included in a measurement configuration message or may be separately broadcast by using a system message. The subframe mode is used to instruct the UE to perform measurement for the neighboring cell. Subframe modes used by the UE to perform measurement for an intra-frequency neighboring cell on different beams may be the same or different. Subframe modes used by the UE to perform measurement for the serving cell and the neighboring cell on a particular beam may be the same or different. The UE may perform measurement based on all configured subframes of the neighboring cell or a subset of the subframes. The subset includes some subframes of all the subframes. Optionally, the radio access network system may configure, for the UE, subframe modes of a plurality of neighboring cells on at least one beam for the UE to receive reference signals of a plurality of intra-frequency neighboring cells to perform measurement. The measurement in this embodiment of the present application may be RRM measurement, CSI measurement, or RLM measurement.

The UE performs measurement according to information about a subframe mode of an intra-frequency neighboring cell on a beam on which the UE resides, sends a measurement result of the neighboring cell to the radio access network system according to a configured reporting period and/or triggering threshold of the measurement for the neighboring cell, sends the measurement result to the receiving module 730.

In this embodiment, a radio access network system exchanges beam mode and subframe mode information with at least one neighboring base station, so that the radio access network system configures RRM measurement, CSI measurement, and/or RLM measurement performed on at least one beam by UE for an intra-frequency neighboring cell. The RRM measurement, CSI measurement, and/or RLM measurement may be used for an operation such as mobility management on the UE or coordinated multipoint transmission (CoMP) to the intra-frequency neighboring cell. When radio channel quality of the intra-frequency neighboring cell is higher than radio channel quality of the serving cell by a given threshold, the UE is handed over to the intra-frequency neighboring cell to improve network quality of service.

When the radio access network system and the neighboring base station are base stations of inter-frequency neighboring cells, that is, the radio access network system and the neighboring base station are neighboring to each other and have different frequencies, the transmission module 710 is configured to send information about a subframe mode corresponding to at least one beam to UE. The information about the subframe mode may be included in a measurement configuration message or may be independent of measurement configuration information. The information about the subframe mode.

The subframe mode includes at least one of the following: information about a subframe mode of a frequency of a serving cell, information about a subframe mode of an intra-frequency neighboring cell, or information about a subframe mode of an inter-frequency neighboring cell. The information about the subframe mode of the frequency of the serving cell is used by the UE to perform measurement for the serving cell on the beam. The information about the subframe mode of the intra-frequency neighboring cell is used by the UE to perform measurement for the intra-frequency neighboring cell on the beam. The information about the subframe mode of the inter-frequency neighboring cell is used by the UE to perform measurement for the inter-frequency neighboring cell on the beam. The information about the subframe mode may be included in a radio resource control connection reconfiguration (RRC Connection Reconfiguration) message, or may be broadcast by using a system message. The subframe mode is used to instruct the UE to receive a reference signal (CRS and/or CSI-RS) sent by a neighboring base station of an inter-frequency neighboring cell to perform measurement for the neighboring cell. The measurement configuration message further includes configuration information of a measurement gap on at least one beam, and the measurement gap is used to instruct the UE to perform measurement for an inter-frequency neighboring cell on a corresponding beam. The measurement gap is a subset of subframes represented by the measurement subframe mode of the inter-frequency neighboring cell on the beam or all of the subframes. That is, the measurement subframe mode of the inter-frequency neighboring cell on the beam is a subframe in which the measurement gap is located, and on the subframe, the network does not schedule the UE, and the UE also does not perform transmission and reception.

In this embodiment, a radio access network system exchanges beam mode and subframe mode information with at least one neighboring base station, so that the radio access network system configures RRM measurement, CSI measurement, and/or RLM measurement performed on at least one beam by UE for an inter-frequency neighboring cell. The RRM measurement, CSI measurement, and/or RLM measurement may be used for an operation such as mobility management on the UE or coordinated multipoint transmission (CoMP) to the inter-frequency neighboring cell. When radio channel quality of the inter-frequency neighboring cell is higher than radio channel quality of the serving cell by a given threshold, the UE is handed over to the inter-frequency neighboring cell to improve network quality of service.

Figure 8:
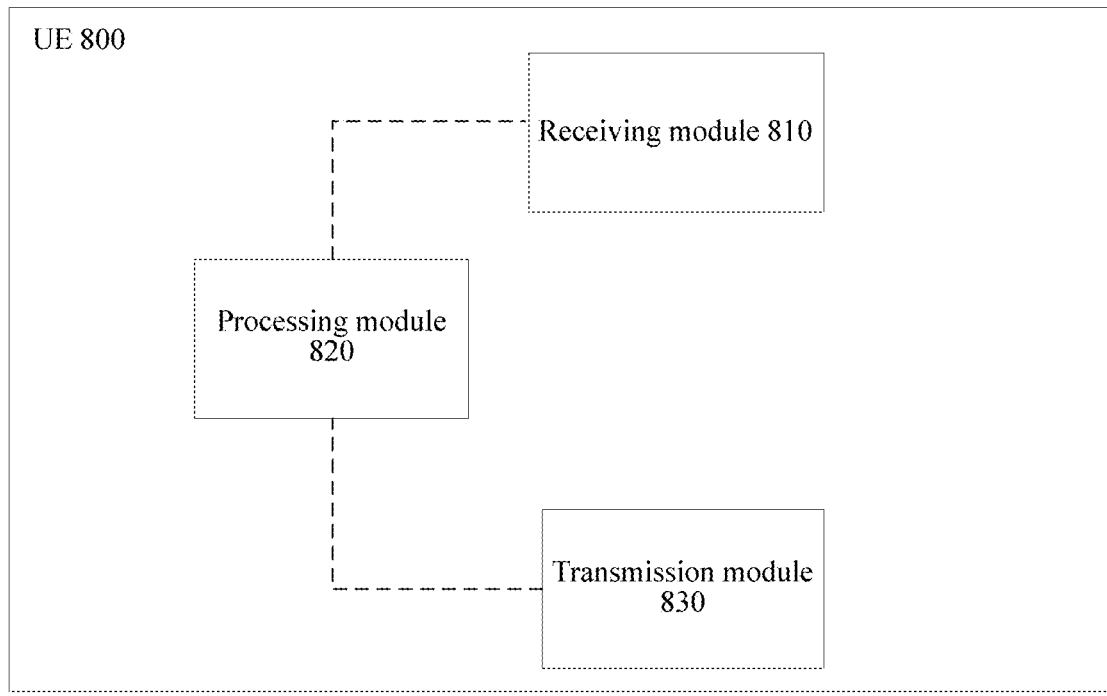
FIG. 8 is a schematic block diagram of UE according to an embodiment of the present application.

FIG. 8 is schematic diagram of UE 800 of an embodiment of the present application. The UE disclosed by FIG. 8 and a description thereof may be based on the methods disclosed by FIG. 1(a) and FIG. 1(b) to FIG. 5 and the descriptions thereof in the embodiments of the present application. The UE 800 includes a receiving module 810, where the receiving module 810 is configured to receive information about a subframe mode that corresponds to at least one beam and that is sent by a radio access network system, the information about the subframe mode may be included in a measurement configuration message or may be separately broadcast by using a system message, and the information about the subframe mode is used to instruct the UE to perform measurement according to the information about the subframe mode. A processing module 820, where the processing module 820 is configured to perform measurement according to the information about the subframe mode of a beam on which the UE resides and generate a measurement result, and a transmission module 830, where the transmission module 830 is configured to send the measurement result to the radio access network system.

Specifically, the receiving module 810 is configured to receive information about a subframe mode that corresponds to at least one beam and that is sent by a radio access network system. The information about the subframe mode may be included in a measurement configuration message or may be separately broadcast by using a system message. The information about the subframe mode is used to instruct the UE to perform measurement. The reference signal may be a reference signal of a serving frequency (CRS) or a reference signal of a serving cell, or may include a reference signal of a serving frequency (CRS) or a reference signal of a serving cell.

The processing module 820 is further configured to perform measurement based on all configured subframes or a subset of the subframes. The subset includes some subframes of all the subframes. The subframe mode corresponding to the beam may be a cell-specific mode applicable to all UEs in a particular cell, or may be a UE-specific mode with different beam modes and subframe modes being configured for different UEs. Optionally, the UE may perform measurement according to a received reference signal, or the UE may perform measurement according to a pilot or a beacon.

The measurement in this embodiment of the present application may be RRM measurement, CSI measurement, or RLM measurement.

For example, an integer quantity N of beams are configured for a cell, and a measurement subframe on each beam is configured. All the beams may correspond to a same subframe mode. For example, the beams are used for measurement in subframes 0 and 5 of each radio frame. For another example, each beam corresponds to a different subframe mode. For example, beams 1 to 9 are respectively used for measurement in subframes 0 to 8.

The receiving module 810 of the UE is further configured to receive reference information sent by the radio access network system. The processing module 820 of the UE performs measurement according to the information about the subframe mode corresponding to the beam on which the UE resides.

The measurement configuration message further includes information such as a reporting period or a triggering threshold, and the transmission module 830 sends the measurement result to the radio access network system according to the reporting period and/or the triggering threshold in the measurement configuration message. That is, when the reporting period and/or the triggering threshold are/is satisfied, the transmission module 830 sends the measurement result.

Optionally, the UE may be located at different locations in a cell because of movement, and the UE performs measurement according to the information about the subframe mode corresponding to the beam on which the UE resides. When the UE reports a measurement result, the measurement result may be an average of measurement results of the UE on a plurality of beams or may be obtained by averaging measurement results on each beam on which the UE resides. In a case of averaging the measurement results on each beam on which the UE resides, the measurement result sent by the UE to the radio access network system may further include beam identifier information. Specifically, each beam in this embodiment has corresponding beam identifier information, the beam identifier information uniquely corresponds to one beam, and the beam identifier information may be carried by using a synchronization channel or a broadcast channel. When the measurement result does not include beam identifier information, it is considered by default that the measurement result is an average of measurement results on a current beam on which the UE resides or an average of measurement results of all the beams.

In this embodiment, beamforming is used for a common channel and a reference signal, and subframe modes of the UE for RRM measurement, CSI measurement, and RLM on at least one beam of a serving frequency or a serving cell are configured, so that the UE can accurately learn subframes in which a reference signal can be received on the beam on which the UE resides, so as to perform measurement based on the reference signal, thereby avoiding an inaccurate measurement result caused by that the UE performs measurement when a network does not send a reference signal to the beam on which the UE resides, and resolving a coverage problem of the common channel or the reference signal and a measurement accuracy problem of the UE.

When the radio access network system and the neighboring base station are base stations of intra-frequency neighboring cells, that is, the radio access network system and the neighboring base station are neighboring to each other and have a same frequency, the processing module 820 of the UE is further configured to perform measurement according to information about a subframe mode of the intra-frequency neighboring cell on a beam on which the UE resides. In this case, the receiving module 810 of the UE is further configured to receive a reference signal sent by the neighboring base station, and send, according to a measurement reporting period and/or triggering threshold configured for the neighboring cell, a measurement result of the neighboring cell to the radio access network system.

Specifically, the UE may be located at different locations in a cell because of movement, and the processing module 820 performs measurement according to measurement subframe configuration of the neighboring cell on the beam on which the UE resides.

When the transmission module 830 sends a measurement result, the measurement result may be an average of measurement results of the UE for the neighboring cell on a plurality of beams or may be obtained by averaging measurement results for the neighboring cell on each beam on which the UE resides. In a case of averaging the measurement results on each beam on which the UE resides, the measurement result sent by the UE may further include beam identifier information of the serving cell. Specifically, each beam in this embodiment has corresponding beam identifier information, the beam identifier information uniquely corresponds to one beam, and the beam identifier information may be carried by using a synchronization channel or a broadcast channel. When the measurement result does not include beam identifier information, it is considered by default that the measurement result is an average of measurement results on a current beam on which the UE resides or an average of measurement results of all the beams.

The beam refers to a beam, on which the UE resides, of the serving cell. Certainly, the UE may also obtain a cell identity and a beam identifier of the neighboring cell by detecting a synchronization channel or a broadcast channel of the neighboring cell. Correspondingly, the UE may additionally add information about the cell identity and the beam identifier of the neighboring cell in a result of the foregoing RRM measurement, a result of the foregoing CSI measurement, and a result of the foregoing RLM measurement.

In this embodiment, a radio access network system exchanges beam mode and subframe mode information with at least one neighboring base station, so that the radio access network system configures RRM measurement and/or CSI measurement performed on at least one beam by UE for an intra-frequency neighboring cell. The RRM measurement and/or CSI measurement may be used for an operation such as mobility management on the UE or coordinated multipoint transmission (CoMP) to the intra-frequency neighboring cell. When radio channel quality of the intra-frequency neighboring cell is higher than radio channel quality of the serving cell by a given threshold, the UE is handed over to the intra-frequency neighboring cell to improve network quality of service.

When the radio access network system and the neighboring base station are base stations of inter-frequency neighboring cells, that is, the radio access network system and the neighboring base station are neighboring to each other and have different frequencies, the measurement configuration message received by the receiving module 810 of the UE further includes configuration information of a measurement gap on at least one beam, and the measurement gap is used to instruct the UE to perform measurement for an inter-frequency neighboring cell on a corresponding beam. The measurement gap is a subset of subframes represented by the measurement subframe mode of the inter-frequency neighboring cell on the beam or all of the subframes. That is, the measurement subframe mode of the inter-frequency neighboring cell on the beam is a subframe in which the measurement gap is located, and on the subframe, the network does not schedule the UE, and the UE also does not perform transmission and reception. The reference signal received by the receiving module 810 of the UE is sent by the neighboring base station.

Subframe modes used by the UE to perform measurement for an inter-frequency neighboring cell on different beams may be the same or different. Subframe modes used by the UE to perform measurement for the serving cell and the neighboring cell on a particular beam may be the same or different. The UE may perform measurement based on all configured subframes of the neighboring cell or a subset of the subframes. The subset includes some subframes of all the subframes. Optionally, the radio access network system may configure, for the UE, subframe modes of a plurality of neighboring cells on at least one beam for the UE to receive reference signals of a plurality of inter-frequency neighboring cells to perform measurement. The measurement in this embodiment of the present application may be RRM measurement, CSI measurement, or RLM measurement.

The UE performs measurement according to information about a subframe mode of an inter-frequency neighboring cell on a beam on which the UE resides, and sends a measurement result of the neighboring cell to the radio access network system according to a configured reporting period and/or triggering threshold of the measurement for the neighboring cell.

Specifically, the UE may be located at different locations in a cell because of movement, and the UE performs measurement according to measurement subframe configuration of the neighboring cell on the beam on which the UE resides.

When the transmission module 830 sends a measurement result, the measurement result may be an average of measurement results of the UE for the neighboring cell on a plurality of beams or may be obtained by averaging measurement results for the neighboring cell on each beam on which the UE resides. In a case of averaging the measurement results on each beam on which the UE resides, the measurement result sent by the UE may further include beam identifier information of the serving cell. Specifically, each beam in this embodiment has corresponding beam identifier information, the beam identifier information uniquely corresponds to one beam, and the beam identifier information may be carried by using a synchronization channel or a broadcast channel. When the measurement result does not include beam identifier information, it is considered by default that the measurement result is an average of measurement results on a current beam on which the UE resides or an average of measurement results of all the beams.

The beam refers to a beam, on which the UE resides, of the serving cell. Certainly, the UE may also obtain a cell identity and a beam identifier of the neighboring cell by detecting a synchronization channel or a broadcast channel of the neighboring cell. Correspondingly, the UE may additionally add information about the cell identity and the beam identifier of the neighboring cell in a result of the foregoing RRM measurement and a result of the foregoing CSI/RLM measurement.

In this embodiment, a radio access network system exchanges beam mode and subframe mode information with at least one neighboring base station, so that the radio access network system configures RRM measurement, CSI measurement, and/or RLM measurement performed on at least one beam by UE for an inter-frequency neighboring cell. The RRM measurement, CSI measurement, and/or RLM measurement may be used for an operation such as mobility management on the UE or coordinated multipoint transmission (CoMP) to the inter-frequency neighboring cell. When radio channel quality of the inter-frequency neighboring cell is higher than radio channel quality of the serving cell by a given threshold, the UE is handed over to the inter-frequency neighboring cell to improve network quality of service.

Figure 9:
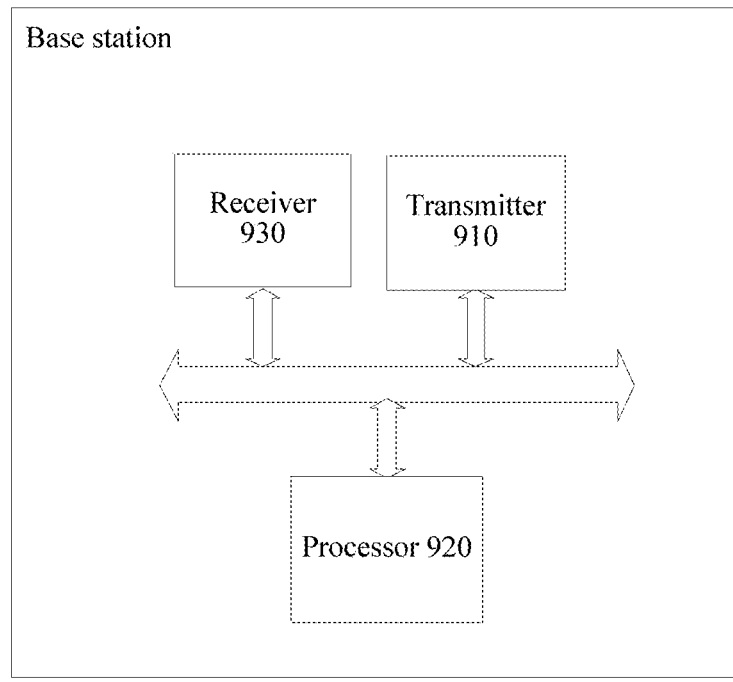
FIG. 9 is a schematic block diagram of a base station in a radio access network system according to another embodiment of the present application.

FIG. 6 is a schematic diagram of a radio access network system according to an embodiment of the present application. The radio access network system includes at least one base station 900. The base station may be a macro base station or a millimeter wave base station, or may include both a micro base station and a millimeter wave base station. FIG. 9 is a schematic block diagram of the base station 900. The system disclosed by FIG. 6 and a description thereof and the system disclosed by FIG. 9 and a description thereof may be both based on the methods disclosed by FIG. 1(*a*) and FIG. 1(*b*) to FIG. 5 and the descriptions thereof in the embodiments of the present application. The base station 900 includes:

a transmitter 910, where the transmitter 910 is configured to send information about a subframe mode corresponding to at least one beam, where the information about the subframe mode is used to instruct UE to perform measurement according to the information about the subframe mode.

Specifically, the information about the subframe mode may be included in a measurement configuration message or may be independent of measurement configuration information. The information about the subframe mode may be included in a radio resource control connection reconfiguration (RRC Connection Reconfiguration) message, or may be broadcast by using a system message. The information about the subframe mode is used to instruct the UE to perform measurement. The subframe mode includes at least one of the following: information about a subframe mode of a frequency of a serving cell, information about a subframe mode of an intra-frequency neighboring cell, or information about a subframe mode of an inter-frequency neighboring cell. The information about the subframe mode of the frequency of the serving cell is used by the UE to perform measurement for the serving cell on the beam. The information about the subframe mode of the intra-frequency neighboring cell is used by the UE to perform measurement for the intra-frequency neighboring cell on the beam. The information about the subframe mode of the inter-frequency neighboring cell is used by the UE to perform measurement for the inter-frequency neighboring cell on the beam.

a receiver 930, where the receiver 930 is configured to receive a measurement result sent by the UE.

a processor 920, configured to generate the information about the subframe mode.

The information about the subframe mode may be sent over a beam of the radio access network system. The UE may correspond to a same or different subframe modes on different beams. The UE may perform measurement based on all configured subframes or a subset of the subframes. The subset includes some subframes of all the subframes. The subframe mode corresponding to the beam may be a cell-specific mode applicable to all UEs in a particular cell, or may be a UE-specific mode with different subframe modes being configured for different UEs. Alternatively, a cell-specific beam mode applicable to all UEs in a particular cell may be configured for different cells, or a UE-specific beam mode may be configured for different UEs, so as to configure different beam modes for different UEs. The beam mode may refer to at least one or more of the following information: information such as a quantity of beams, a beam switching (or referred to as beam scanning) sequence, or a beam switching time. The measurement in this embodiment of the present application may be RRM measurement, CSI measurement, or RLM measurement.

For example, an integer quantity N of beams are configured for a cell, and a measurement subframe on each beam is configured. All the beams may correspond to a same subframe mode. For example, the beams are used for measurement in subframes 0 and 5 of each radio frame. For another example, each beam corresponds to a different subframe mode. For example, beams 1 to 9 are respectively used for measurement in subframes 0 to 8.

Optionally, only a subframe mode corresponding to one of the beams is configured, and a beam scanning mode is configured. The beam scanning mode includes a beam scanning sequence and a time interval for switching between beams. For example, on a network, a subframe mode configured on beam 0 is subframe 0, a configured beam scanning sequence is from beam 0 to beam 6, a time interval for switching is one subframe, a rotation period is four radio frames, that is, a scan from beam 0 to beam 6 is performed once in every four radio frames, and each radio frame includes 10 subframes. UE calculates a subframe in which the UE can receive a reference signal on each beam, that is, subframe 0 of radio frame 0, subframe 0 of radio frame 4, and subframe 0 of radio frame 8 for beam 0; subframe 1 of radio frame 0, subframe 1 of radio frame 4, and subframe 1 of radio frame 8 for beam 1; subframe 2 of radio frame 0, subframe 2 of radio frame 4, and subframe 2 of radio frame 8 for beam 2; and so on.

The UE performs measurement according to information about a subframe mode corresponding to a beam on which the UE resides. The receiver 930 receives the measurement result.

In this embodiment, beamforming is used for a common channel and a reference signal, and subframe modes of the UE for RRM measurement, CSI measurement, and RLM on at least one beam of a serving frequency or a serving cell are configured, so that the UE can accurately learn subframes in which a reference signal can be received on the beam on which the UE resides, so as to perform measurement based on the reference signal, thereby avoiding an inaccurate measurement result caused by that the UE performs measurement when a network does not send a reference signal to the beam on which the UE resides, and resolving a coverage problem of the common channel or the reference signal and a measurement accuracy problem of the UE.

Optionally, the receiver 930 is further configured to receive information about a beam mode and information about a subframe mode of a neighboring base station neighboring to the radio access network system. The radio access network system and the neighboring base station are base stations of intra-frequency neighboring cells, that is, the radio access network system and the neighboring base station are neighboring to each other and have a same frequency. The receiver 930 of the base station in the radio access network system may receive the information about the beam mode and the information about the subframe mode of the neighboring base station, in a scenario such as when a network-to-network interface is established, or when configuration information such as a beam mode and a subframe mode of a network is updated, or when a network prepares to configure measurement on an intra-frequency neighboring cell for UE. The neighboring base station sends the information about the beam mode and the information about the subframe mode of the neighboring base station to the radio access network system. Sending of the information about the beam mode and the subframe mode between the radio access network system and the neighboring base station may be initiated by the radio access network system or the neighboring base station. The exchanged beam mode and subframe mode may be cell-specific modes applicable to all UEs in a particular cell.

The radio access network system, according to the information about the beam mode and the subframe mode sent by the neighboring base station and information about a beam mode and a subframe mode of a cell provided by the radio access network system, the processor 920 is further configured to determine subframes in which a reference signal is sent by a neighboring network on a corresponding beam in beam directions of the radio access network system. As shown in FIG. 4, beams 3, 4, and 5 of two neighboring cells correspond to each other, so that according to a subframe mode of a neighboring base station on beams 3, 4, and 5, a subframe mode for the UE to perform measurement for a neighboring cell on beams 3, 4, and 5 of a serving cell may be configured.

The transmitter 910 of the base station in the radio access network system is further configured to send information about a subframe mode corresponding to at least one beam to UE. The information about the subframe mode may be included in a measurement configuration message or may be separately broadcast by using a system message. The subframe mode is used to instruct the UE to perform measurement for the neighboring cell. Subframe modes used by the UE to perform measurement for an intra-frequency neighboring cell on different beams may be the same or different. Subframe modes used by the UE to perform measurement for the serving cell and the neighboring cell on a particular beam may be the same or different. The UE may perform measurement based on all configured subframes of the neighboring cell or a subset of the subframes. The subset includes some subframes of all the subframes. Optionally, the radio access network system may configure, for the UE, subframe modes of a plurality of neighboring cells on at least one beam for the UE to receive reference signals of a plurality of intra-frequency neighboring cells to perform measurement. The measurement in this embodiment of the present application may be RRM measurement, CSI measurement, or RLM measurement.

The UE performs measurement according to information about a subframe mode of an intra-frequency neighboring cell on a beam on which the UE resides, sends a measurement result of the neighboring cell to the radio access network system according to a configured reporting period and/or triggering threshold of the measurement for the neighboring cell, and sends the measurement result to the receiver 930.

In this embodiment, a radio access network system exchanges beam mode and subframe mode information with at least one neighboring base station, so that the radio access network system configures RRM measurement, CSI measurement, and/or RLM measurement performed on at least one beam by UE for an intra-frequency neighboring cell. The RRM measurement, CSI measurement, and/or RLM measurement may be used for an operation such as mobility management on the UE or coordinated multipoint transmission (CoMP) to the intra-frequency neighboring cell. When radio channel quality of the intra-frequency neighboring cell is higher than radio channel quality of the serving cell by a given threshold, the UE is handed over to the intra-frequency neighboring cell to improve network quality of service.

When the radio access network system and the neighboring base station are base stations of inter-frequency neighboring cells, that is, the radio access network system and the neighboring base station are neighboring to each other and have different frequencies, the transmitter 910 is configured to send information about a subframe mode corresponding to at least one beam to UE. The information about the subframe mode may be included in a measurement configuration message or may be independent of measurement configuration information. The information about the subframe mode may be included in a radio resource control connection reconfiguration (RRC Connection Reconfiguration) message, or may be broadcast by using a system message. The subframe mode is used to instruct the UE to receive a reference signal (CRS and/or CSI-RS) sent by a neighboring base station of an inter-frequency neighboring cell to perform measurement for the neighboring cell. The measurement configuration message further includes configuration information of a measurement gap on at least one beam, and the measurement gap is used to instruct the UE to perform measurement for an inter-frequency neighboring cell on a corresponding beam. The measurement gap is a subset of subframes represented by the measurement subframe mode of the inter-frequency neighboring cell on the beam or all of the subframes. That is, the measurement subframe mode of the inter-frequency neighboring cell on the beam is a subframe in which the measurement gap is located, and on the subframe, the network does not schedule the UE, and the UE also does not perform transmission and reception.

In this embodiment, a radio access network system exchanges beam mode and subframe mode information with at least one neighboring base station, so that the radio access network system configures RRM measurement, CSI measurement, and/or RLM measurement performed on at least one beam by UE for an inter-frequency neighboring cell. The RRM measurement, CSI measurement, and/or RLM measurement may be used for an operation such as mobility management on the UE or coordinated multipoint transmission (CoMP) to the inter-frequency neighboring cell. When radio channel quality of the inter-frequency neighboring cell is higher than radio channel quality of the serving cell by a given threshold, the UE is handed over to the inter-frequency neighboring cell to improve network quality of service.

Figure 10:
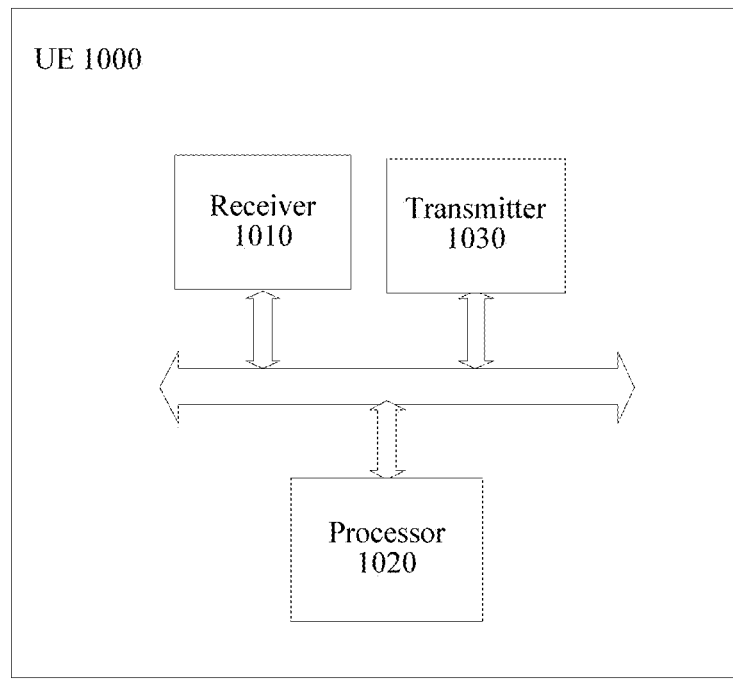
FIG. 10 is a schematic block diagram of UE according to another embodiment of the present application.

FIG. 10 is schematic diagram of UE 1000 of an embodiment of the present application. The UE 1000 disclosed by FIG. 10 and a description thereof may be based on the methods disclosed by FIG. 1(*a*) and FIG. 1(*b*) to FIG. 5 and the descriptions thereof in the embodiments of the present application. The UE 1000 includes a receiver 1010, where the receiver 1010 is configured to receive information about a subframe mode that corresponds to at least one beam and that is sent by a radio access network system, the information about the subframe mode may be included in a measurement configuration message or may be separately broadcast by using a system message, and the information about the subframe mode is used to instruct the UE to perform measurement according to the information about the subframe mode, a processor 1020, where the processor 1020 is configured to perform measurement according to the information about the subframe mode of a beam on which the UE resides and generate a measurement result, and a transmitter 1030, where the transmitter 103*o* is configured to send the measurement result to the radio access network system.

Specifically, the receiver 1010 is configured to receive information about a subframe mode that corresponds to at least one beam and that is sent by a radio access network system. The information about the subframe mode may be included in a measurement configuration message, or may be separately broadcast by using a system message. The information about the subframe mode is used to instruct the UE to perform measurement. The reference signal may be a reference signal of a serving frequency (CRS) or a reference signal of a serving cell, or may include a reference signal of a serving frequency (CRS) or a reference signal of a serving cell.

The processor 1020 is further configured to perform measurement based on all configured subframes or a subset of the subframes. The subset includes some subframes of all the subframes. The subframe mode corresponding to the beam may be a cell-specific mode applicable to all UEs in a particular cell, or may be a UE-specific mode with different beam modes and subframe modes being configured for different UEs. Optionally, the UE may perform measurement according to a received reference signal, or the UE may perform measurement according to a pilot or a beacon. The measurement in this embodiment of the present application may be RRM measurement, CSI measurement, or RLM measurement.

For example, an integer quantity N of beams are configured for a cell, and a measurement subframe on each beam is configured. All the beams may correspond to a same subframe mode. For example, the beams are used for measurement in subframes 0 and 5 of each radio frame. For another example, each beam corresponds to a different subframe mode. For example, beams 1 to 9 are respectively used for measurement in subframes 0 to 8.

The receiver 1010 of the UE is further configured to receive reference information sent by the radio access network system. The processor 1020 of the UE performs measurement according to the information about the subframe mode corresponding to the beam on which the UE resides.

The measurement configuration message further includes information such as a reporting period or a triggering threshold, and the transmitter 1030 sends the measurement result to the radio access network system according to the reporting period and/or the triggering threshold in the measurement configuration message. That is, when the reporting period and/or the triggering threshold are/is satisfied, the transmitter 1030 sends the measurement result.

Optionally, the UE may be located at different locations in a cell because of movement, and the UE performs measurement according to the information about the subframe mode corresponding to the beam on which the UE resides. When the UE reports a measurement result, the measurement result may be an average of measurement results of the UE on a plurality of beams or may be obtained by averaging measurement results on each beam on which the UE resides. In a case of averaging the measurement results on each beam on which the UE resides, the measurement result sent by the UE to the radio access network system may further include beam identifier information. Specifically, each beam in this embodiment has corresponding beam identifier information, the beam identifier information uniquely corresponds to one beam, and the beam identifier information may be carried by using a synchronization channel or a broadcast channel. When the measurement result does not include beam identifier information, it is considered by default that the measurement result is an average of measurement results on a current beam on which the UE resides or an average of measurement results of all the beams.

In this embodiment, beamforming is used for a common channel and a reference signal, and subframe modes of the UE for RRM measurement, CSI measurement, and RLM on at least one beam of a serving frequency or a serving cell are configured, so that the UE can accurately learn subframes in which a reference signal can be received on the beam on which the UE resides, so as to perform measurement based on the reference signal, thereby avoiding an inaccurate measurement result caused by that the UE performs measurement when a network does not send a reference signal to the beam on which the UE resides, and resolving a coverage problem of the common channel or the reference signal and a measurement accuracy problem of the UE.

When the radio access network system and the neighboring base station are base stations of intra-frequency neighboring cells, that is, the radio access network system and the neighboring base station are neighboring to each other and have a same frequency, the processor 1020 of the UE is further configured to perform measurement according to information about a subframe mode of the intra-frequency neighboring cell on a beam on which the UE resides. In this case, the receiver 1010 of the UE is further configured to receive a reference signal sent by the neighboring base station, and send, according to a measurement reporting period and/or triggering threshold configured for the neighboring cell, a measurement result of the neighboring cell to the radio access network system.

Specifically, the UE may be located at different locations in a cell because of movement, and the processor 1020 performs measurement according to measurement subframe configuration of the neighboring cell on the beam on which the UE resides.

When the transmitter 103o sends a measurement result, the measurement result may be an average of measurement results of the UE for the neighboring cell on a plurality of beams or may be obtained by averaging measurement results for the neighboring cell on each beam on which the UE resides. In a case of averaging the measurement results on each beam on which the UE resides, the measurement result sent by the UE may further include beam identifier information of the serving cell. Specifically, each beam in this embodiment has corresponding beam identifier information, the beam identifier information uniquely corresponds to one beam, and the beam identifier information may be carried by using a synchronization channel or a broadcast channel. When the measurement result does not include beam identifier information, it is considered by default that the measurement result is an average of measurement results on a current beam on which the UE resides or an average of measurement results of all the beams.

The beam refers to a beam, on which the UE resides, of the serving cell. Certainly, the UE may also obtain a cell identity and a beam identifier of the neighboring cell by detecting a synchronization channel or a broadcast channel of the neighboring cell. Correspondingly, the UE may additionally add information about the cell identity and the beam identifier of the neighboring cell in a result of the foregoing RRM measurement and a result of the foregoing CSI/RLM measurement.

In this embodiment, a radio access network system exchanges beam mode and subframe mode information with at least one neighboring base station, so that the radio access network system configures RRM measurement, CSI measurement, and/or RLM measurement performed on at least one beam by UE for an intra-frequency neighboring cell. The RRM measurement, CSI measurement, and/or RLM measurement may be used for an operation such as mobility management on the UE or coordinated multipoint transmission (CoMP) to the intra-frequency neighboring cell. When radio channel quality of the intra-frequency neighboring cell is higher than radio channel quality of the serving cell by a given threshold, the UE is handed over to the intra-frequency neighboring cell to improve network quality of service.

When the radio access network system and the neighboring base station are base stations of inter-frequency neighboring cells, that is, the radio access network system and the neighboring base station are neighboring to each other and have different frequencies, the measurement configuration message received by the receiver 1010 of the UE further includes configuration information of a measurement gap on at least one beam, and the measurement gap is used to instruct the UE to perform measurement for an inter-frequency neighboring cell on a corresponding beam. The measurement gap is a subset of subframes represented by the measurement subframe mode of the inter-frequency neighboring cell on the beam or all of the subframes. That is, the measurement subframe mode of the inter-frequency neighboring cell on the beam is a subframe in which the measurement gap is located, and on the subframe, the network does not schedule the UE, and the UE also does not perform transmission and reception. The reference signal received by the receiver 1010 of the UE is sent by the neighboring base station.

Subframe modes used by the UE to perform measurement for an inter-frequency neighboring cell on different beams may be the same or different. Subframe modes used by the UE to perform measurement for the serving cell and the neighboring cell on a particular beam may be the same or different. The UE may perform measurement based on all configured subframes of the neighboring cell or a subset of the subframes. The subset includes some subframes of all the subframes. Optionally, the radio access network system may configure, for the UE, subframe modes of a plurality of neighboring cells on at least one beam for the UE to receive reference signals of a plurality of inter-frequency neighboring cells to perform measurement. The measurement in this embodiment of the present application may be RRM measurement, CSI measurement, or RLM measurement.

The UE performs measurement according to information about a subframe mode of an inter-frequency neighboring cell on a beam on which the UE resides, and sends a measurement result of the neighboring cell to the radio access network system according to a configured reporting period and/or triggering threshold of the measurement for the neighboring cell.

Specifically, the UE may be located at different locations in a cell because of movement, and the UE performs measurement according to measurement subframe configuration of the neighboring cell on the beam on which the UE resides.

When the transmitter 1030 sends a measurement result, the measurement result may be an average of measurement results of the UE for the neighboring cell on a plurality of beams or may be obtained by averaging measurement results for the neighboring cell on each beam on which the UE resides. In a case of averaging the measurement results on each beam on which the UE resides, the measurement result sent by the UE may further include beam identifier information of the serving cell. Specifically, each beam in this embodiment has corresponding beam identifier information, the beam identifier information uniquely corresponds to one beam, and the beam identifier information may be carried by using a synchronization channel or a broadcast channel. When the measurement result does not include beam identifier information, it is considered by default that the measurement result is an average of measurement results on a current beam on which the UE resides or an average of measurement results of all the beams.

The beam refers to a beam, on which the UE resides, of the serving cell. Certainly, the UE may also obtain a cell identity and a beam identifier of the neighboring cell by detecting a synchronization channel or a broadcast channel of the neighboring cell. Correspondingly, the UE may additionally add information about the cell identity and the beam identifier of the neighboring cell in a result of the foregoing RRM measurement and a result of the foregoing CSI/RLM measurement.

In this embodiment, a radio access network system exchanges beam mode and subframe mode information with at least one neighboring base station, so that the radio access network system configures RRM measurement and/or CSI measurement performed on at least one beam by UE for an inter-frequency neighboring cell. The RRM measurement and/or CSI measurement may be used for an operation such as mobility management on the UE or coordinated multipoint transmission (CoMP) to the inter-frequency neighboring cell. When radio channel quality of the inter-frequency neighboring cell is higher than radio channel quality of the serving cell by a given threshold, the UE is handed over to the inter-frequency neighboring cell to improve network quality of service.

The foregoing descriptions are merely examples of embodiments of the present application, but are not intended to limit the present application. Any modification, equivalent replacement, and improvement made without departing from the spirit and principle of the present application shall fall within the protection scope of the present application.

What is claimed is:

1. A measurement method, comprising:
   sending, by a radio access network system to a user equipment (UE), information about a UE-specific subframe mode corresponding to at least one beam of a plurality of beams, wherein a beam of the plurality of beams has a subframe mode applicable to a UE on the Particular beam that is different from the subframe mode of another UE within the same beam, wherein the information about the subframe mode instructs the UE to perform measurement according to the information about the subframe mode, and further according to a beam mode of a first beam of the plurality of beams on which the UE resides, wherein the information about the beam mode comprises at least one of a quantity of beams of the plurality of beams, a beam switching sequence, or a beam switching time; and
   receiving, by the radio access network system, a measurement result sent by the UE.

2. The method according to claim 1, wherein the information about the subframe mode comprises information about a subframe mode of a frequency of a serving cell, information about a subframe mode of an intra-frequency neighboring cell, or information about a subframe mode of an inter-frequency neighboring cell;
   wherein the information about the subframe mode of the frequency of the serving cell is used by the UE to perform measurement for the serving cell on the beam;
   wherein the information about the subframe mode of the intra-frequency neighboring cell is used by the UE to perform measurement for the intra-frequency neighboring cell on the beam; and
   wherein the information about the subframe mode of the inter-frequency neighboring cell is used by the UE to perform measurement for the inter-frequency neighboring cell on the beam.

3. The method according to claim 1, wherein the sending, by a radio access network system, information about the subframe mode further comprises:
   receiving, by the radio access network system, information about a beam mode and the information about the subframe mode of a neighboring base station; and
   sending, by the radio access network system, information about a beam mode and the information about the subframe mode of the radio access network system to the neighboring base station.

4. The method according to claim 3, wherein the radio access network system further sends a measurement configuration message to the UE, wherein the measurement configuration message comprises measurement gap configuration information on at least one beam, and wherein the measurement gap configuration information instructs the UE to perform measurement for an inter-frequency neighboring cell on a corresponding beam.

5. A radio access network system, wherein the radio access network system comprises at least one base station, and the base station comprises:

a transmitter, wherein the transmitter is configured to send information about a UE-specific subframe mode corresponding to at least one beam of a plurality of beams, wherein a beam of the plurality of beams has a subframe mode applicable to a UE on the particular beam that is different from the subframe mode of another UE within the same beam, wherein the information about the subframe mode instructs UE to perform measurement according to the information about the subframe mode, and further according to a beam mode of a first beam of the plurality of beams on which the UE resides, wherein the information about the beam mode comprises at least one of a quantity of beams of the plurality of beams, a beam switching sequence, or a beam switching time;

a receiver, wherein the receiver is configured to receive a measurement result sent by the UE;

a processor; and a non-transitory computer-readable storage medium storing a program to be executed by the processor, the program including instructions to:
generate a measurement configuration message.

6. The system according to claim 5, wherein the information about the subframe mode comprises information about a subframe mode of a frequency of a serving cell, information about a subframe mode of an intra-frequency neighboring cell, or information about a subframe mode of an inter-frequency neighboring cell;
wherein the information about the subframe mode of the frequency of the serving cell is used by the UE to perform measurement for the serving cell on the beam;
wherein the information about the subframe mode of the intra-frequency neighboring cell is used by the UE to perform measurement for the intra-frequency neighboring cell on the beam; and
wherein the information about the subframe mode of the inter-frequency neighboring cell is used by the UE to perform measurement for the inter-frequency neighboring cell on the beam.

7. The system according to claim 5, wherein the receiver is further configured to receive information about a beam mode and the information about the subframe mode of a neighboring base station; and
wherein the transmitter is further configured to send information about a beam mode and the information about the subframe mode of the radio access network system to the neighboring base station.

8. The system according to claim 7, wherein the transmitter is further configured to send a measurement configuration message, wherein the measurement configuration message comprises measurement gap configuration information on at least one beam, and wherein the measurement gap configuration information is used to instruct the UE to perform measurement for an inter-frequency neighboring cell on a corresponding beam.

9. A user equipment (UE), wherein the UE comprises:
a receiver, wherein the receiver is configured to receive, from a radio access network system, information about a UE-specific subframe mode corresponding to at least one beam of a plurality of beams, wherein a beam of the plurality of beams has a subframe mode applicable to a UE on the particular beam that is different from the subframe mode of another UE within the same beam, wherein the information about the subframe mode instructs the UE to perform measurement according to the information about the subframe mode, and further according to a beam mode of a first beam of the plurality of beams on which the UE resides, wherein the information about the beam mode comprises at least one of a quantity of beams of the plurality of beams, a beam switching sequence, or a beam switching time;

a processor;

a non-transitory computer-readable storage medium storing a program to be executed by the processor, the program including instructions to:
perform measurement according to the information about the subframe mode of the first beam and generate a measurement result;

a transmitter, wherein the transmitter is configured to send the measurement result to the radio access network system.

10. The UE according to claim 9, wherein the information about the subframe mode comprises information about a subframe mode of a frequency of a serving cell, information about a subframe mode of an intra-frequency neighboring cell, or information about a subframe mode of an inter-frequency neighboring cell;
wherein the information about the subframe mode of the frequency of the serving cell is used by the UE to perform measurement for the serving cell on the beam;
wherein the information about the subframe mode of the intra-frequency neighboring cell is used by the UE to perform measurement for the intra-frequency neighboring cell on the beam; and
wherein the information about the subframe mode of the inter-frequency neighboring cell is used by the UE to perform measurement for the inter-frequency neighboring cell on the beam.

11. The UE according to claim 9, wherein the receiver is further configured to receive a reference signal sent by the radio access network system; and
wherein the beam on which the UE resides is sent by the radio access network system.

12. The UE according to claim 9, wherein the receiver is further configured to receive a reference signal sent by a neighboring base station; and
wherein the neighboring base station neighbors the radio access network system.

13. The UE according to claim 12, wherein the receiver is further configured to receive a measurement configuration message, wherein the measurement configuration message comprises measurement gap configuration information on at least one beam, and wherein the measurement gap configuration information instructs the UE to perform measurement for an inter-frequency neighboring cell on a corresponding beam.

* * * * *